Dec. 9, 1930.  C. B. MAHAN ET AL  1,784,298
WIRE STRIPPING MACHINE
Filed March 2, 1929   2 Sheets-Sheet 1
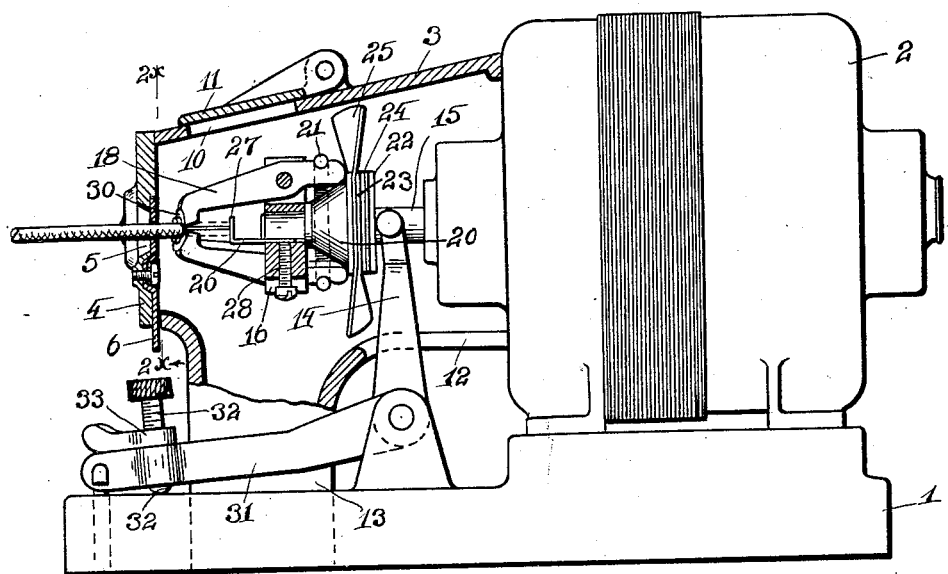
Fig.1.
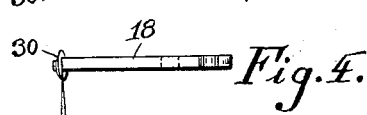
Fig.3.
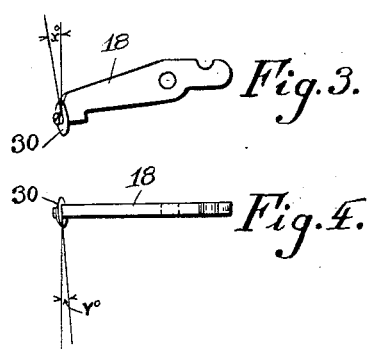
Fig.4.
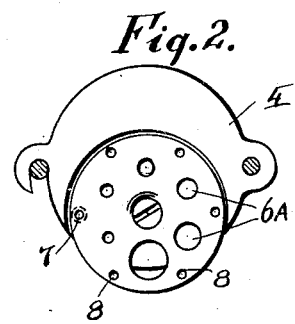
Fig.2.
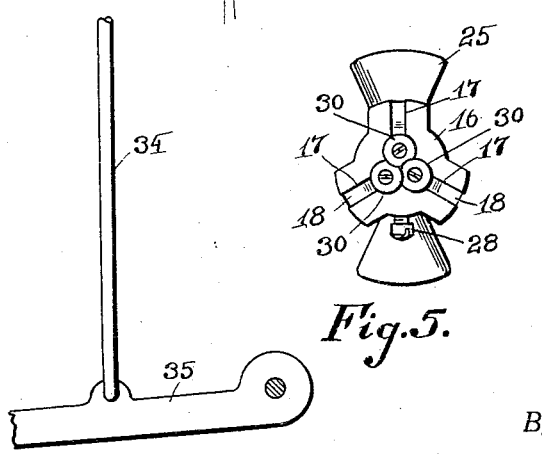
Fig.5.            Fig.6.
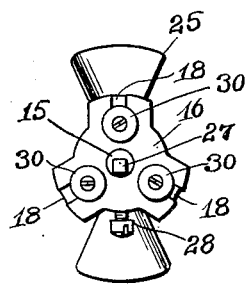
Inventors
Charles B. Mahan & Carl M. Weber
By
Eric Schinger   Attorney Dec. 9, 1930.  C. B. MAHAN ET AL  1,784,298
WIRE STRIPPING MACHINE
Filed March 2, 1929   2 Sheets-Sheet 2

Inventors
Charles B. Mahan & Carl M. Weber
By
Eric Schinger, Attorney

Patented Dec. 9, 1930

1,784,298

UNITED STATES PATENT OFFICE

CHARLES B. MAHAN AND CARL M. WEBER, OF ROCHESTER, NEW YORK, ASSIGNORS TO WEBER MACHINE CORPORATION, A CORPORATION OF NEW YORK

WIRE-STRIPPING MACHINE

Application filed March 2, 1929. Serial No. 344,075.

This invention relates to wire stripping machines which are used for the purpose of stripping the insulation from insulated wire, and the invention has for its various objects:

To provide a stripping machine which is simple in construction and efficient in operation.

To provide a machine with which the insulation can be quickly and easily stripped from insulated solid wire, stranded tinsel, multi-conductor cable or any other insulated wire in order to expose the wire at predetermined points or sections in the length of the wire.

To provide the stripping machine with suitable adjusting means so that wire of various diameters may be stripped in the machine.

To provide other adjusting means in the machine with which the length of the section of the wire to be stripped can be gauged and the point automatically located at which the stripping operation is to begin on the wire.

To provide the machine with means whereby the insulation stripped from the wire is blown away into a suitable receiving duct so that the dust caused by the stripping operation is kept out of the bearings of the spindle of the machine and away from the operator of the machine.

To provide circular cutting knives for the stripping machine so that the cutting edge of each knife can be quickly changed by a slight turn of the knife without throwing the machine out of adjustment.

To provide an angular mounting for each of the knives and locate them with relation to one another so that when brought in contact with the insulation each knife will individually and efficiently cut the insulation with its cutting edge.

All these and other objects of this invention will be apparent from the accompanying drawings, the specification and the appended claims forming a part thereof.

In the accompanying drawings:

Figure 1 is a side elevation and partial sectional view of the wire stripping machine.

Figure 2 is a vertical sectional view of the machine, the section being taken on the line 2x—2x of Figure 1 and viewed in the direction of the arrow to illustrate the adjustable diaphragm and its mounting thru which wires of different diameters are fed into the machine.

Figure 3 is a detail side elevation of one of the jaws and the cutting knife carried thereby.

Figure 4 is a top plan view of the jaw and its cutting knife illustrated in Figure 3.

Figure 5 is a front elevation of the completed stripper head as it appears when the jaws and their cutting knives are brought together to encircle a wire for the stripping operation.

Figure 6 is a front elevation of the stripper head with the jaws opened ready to have a wire inserted between them.

In the several figures of the drawings like reference numerals indicate like parts.

Figure 9:
Figure 9 illustrates a continuous section of wire which has been stripped in the machine at predetermined intervals.

The machine forming the subject matter of this invention is intended for use primarily where insulated wire of all kinds must be stripped in great quantities such as in the manufacture of radio and other electrical apparatus in which a great number of wire connections must be made. The machine is provided with suitable adjustments so that the wire is stripped uniformly at predetermined points and over predetermined lengths and these adjustments are easily and quickly made. Further adjustments for the accommodation of wire of different diameter and other adjustments for the renewal of the cutting edge of the cutting knives all serve to make the stripping machine universal in its application and use.

As illustrated in the figures the wire stripping machine including its driving means is mounted on a suitable bed plate or base 1. The driving means for the machine illustrated in Figure 1 comprises the electric motor 2 which is bolted to the base at the right hand end thereof. The housing of the motor 2 is extended at the left by the housing 3 surrounding the stripper mechanism and this extension housing is suitably fastened to the motor housing and forms a continuation of it on one side of the motor. The end of the housing 3 is closed by the cover plate 4 in the center of which is located the opening 5 thru which the wire to be stripped is inserted.

At the back of the cover plate 4 and eccentric thereto is mounted to rotate the circular gauge plate 6. This gauge plate is provided with a series of openings of varying diameter preferably $\frac{5}{32}$, $\frac{3}{16}$, $\frac{1}{4}$, $\frac{5}{16}$, $\frac{3}{8}$ and $\frac{1}{2}$ of an inch in diameter and these holes are radially spaced from the center of the gauge plate so that they can be consecutively brought in line with the center of the opening 5 in the cover plate 4 on the rotation of the gauge plate. In this way a large or small hole may be located in the cover plate corresponding to the diameter of the wire which is to be inserted into the machine for the purpose of stripping the insulation from it. A suitable friction means such as a small steel ball 7 is seated in the back of the cover plate and is projected into the holes 8, 8 so that the engagement of the ball with one of these holes will hold the gauge plate in a position in which the desired size hole 6A of the gauge plate is held in line with the center of the opening 5 in the cover plate.

In the top of the housing 3 is provided a port opening 10 which may be opened or closed by the port cover 11 which is suitably hinged to the top of the housing. In the bottom of the housing 3 is provided the opening 12 and the exhaust duct 13. The opening 12 is located adjacent to the motor housing and thru it extends the operating lever 14. The duct 13 is located near the front of the housing and extends from the bottom of the housing downwardly thru the base or bed plate 1 for a purpose that will presently appear.

The armature shaft 15 of the motor 2 projects into the housing 3 and provides the spindle 15 on which the stripper head and its operating mechanism are carried. This stripper head comprises the collar 16 having three radial slots 17, 17, 17 uniformly spaced in the periphery thereof. In each of these slots is mounted to rock on a suitable pivot pin a jaw lever 18, the forward end of which carries a circular cutting knife 30. The rearward end of each jaw lever 18 engages the operating cone 20 and is held in contact with the cam surface of the cone by the continuous coil spring 21 which encircles the rearward ends of all of the lever jaws. The spring is held in place on the ends of the jaw levers by its engagement into the depressions provided in the ends for this purpose.

The operating cone 20 is mounted to slide on the spindle 15 provided by the extension of the armature shaft and is adapted to be moved forward thereon, that is to the left in Figure 1, by the operating lever 14. The upper end of this operating lever is forked to form a yoke and partially encircles the spindle and is adapted to make contact with the rear of the collar 22. Between the collar 22 and a second similar collar 23 is located the antifriction thrust bearing 24. Fastened to the rear of the operating cone ahead of the collar 23 is the bi-bladed fan 25 which rotates with the cone for a purpose that will presently appear. The collars and antifriction thrust bearing are provided to reduce the friction between the operating lever and the collar 22 as it permits this collar to remain stationary with the end of the operating lever 14 while the antifriction thrust bearing and the operating cone 20 are rotating.

The stripper head of the machine is fastened to the outer end of the spindle so as to rotate with it. In the machine illustrated in Figure 1 the spindle is cut away at the perimeter to provide an opening between the spindle and the stripper head into which the stem 26 of the gauge 27 is adapted to be inserted and fastened in place therein by the set screw 28. The stem of the gauge 27 may thus be adjustably fastened to the end of the spindle in order to project the required distance from the spindle and form a stop against which the wire to be stripped is held in order to strip all of the wires the desired uniform length.

The cutting of the insulation is done by the cutting edge of the circular knives 30 fastened to the outer ends of the jaw lever 18. As illustrated in Figures 3 and 4 the outer ends of the jaw levers are beveled vertically and horizontally so that when the circular knife 30 is clamped in place thereon it is held in a predetermined angular position in both the vertical and horizontal plane. It is this angular mounting of the knives that secures to the machine the high efficiency in stripping the insulation from wire, in that it provides the proper cutting angle for the rotating cutting edge of each of the knives and allows the knife edges to overlap each other, as illustrated in Figure 5, when brought together to close in over the insulation of the wire to be stripped.

The hub of the operating lever 14 extends to one side of the housing 3 and from it extends the arm 31. Near the outer end of this arm is provided the adjusting screw 32 which is threaded thru the arm to project from the under side and form the stop which arrests the downward movement of the arm at the desired point. A locknut 33 with a lever for rotating it is threaded on the adjusting screw and serves to lock the adjusting screw at any desired location. To the outer end of the arm 31 is attached a suitable link 34 which passes thru the bed plate of the machine and is in turn attached to a suitable treadle 35. The arm 31 is thus rocked on the depression of the treadle by the operator's foot which in turn operates the machine to perform the stripping operation as will now be described.

The jaw levers 18 are normally held apart as illustrated in Figure 6 by the contraction of the coil spring 21 which encircles the rear ends of these levers. This action of the spring also forces the operating cone 20 rearwardly on the spindle 15 and rocks the operating lever 14 and arm 31 to its starting position. The wire to be stripped is inserted into the opening in the cover plate and the opening in the diaphragm until the end of the wire has reached the gauge 27 and a further movement is arrested by it. The operator then depresses the treadle 35 which rocks the arm 31 and with it the operating lever 14. The operating lever 14 in turn slides the operating cone 20 forwardly along the spindle and in so doing forces the rear ends of the jaw levers up on the inclined cone surface against the pressure of the spring 21. As the rear ends of the jaw levers ride up on the cone surface the forward ends of these levers with their knives 30 close in on the wire which has been inserted between them, until the knives engage the insulation and cut into it the full depth. The stripper head is rotated at a high rate of speed and as the knives thereof enter the insulation they quickly cut into it and sever the portion of the insulation of the wire which has been inserted in the stripper head. On the withdrawal of the wire while the knives are still closed around the insulated wire the severed portion of the insulation within the stripper head is stripped from the wire and the bare wire exposed in place of it.

In order to secure the proper cutting depth for the knives, which depends on the thickness of the insulation surrounding the wire, the movement of the arm 31 is adjusted by means of the adjusting screw 32. This screw is threaded in or out of the arm in order to allow the arm to swing the desired distance which will bring the cutting knives together to a point where they will cut into the insulation to sever it without however cutting into the wire which it surrounds. By adjusting the adjusting screw, wire of large and small diameter, as well as wire with thick or thin insulation, can thus be stripped in the machine.

When the insulation is cut by the cutting knives of the stripper head a certain amount of dust is produced but this dust and lint as well as the insulation stripped from the wire is blown away from the wire by the fan 25 carried by the operating cone 20 as fast as it is severed from it. This fan takes its air from the opening 12 in the bottom of the housing 3 and blows it forwardly and downwardly into the duct 13 leading from the housing near the front thereof. The dust and insulation is thus kept from entering the bearings of the spindle as well as the motor and by blowing it downwardly out of the housing thru the duct 13 it is also kept away from the operator of the machine.

Figure 7:
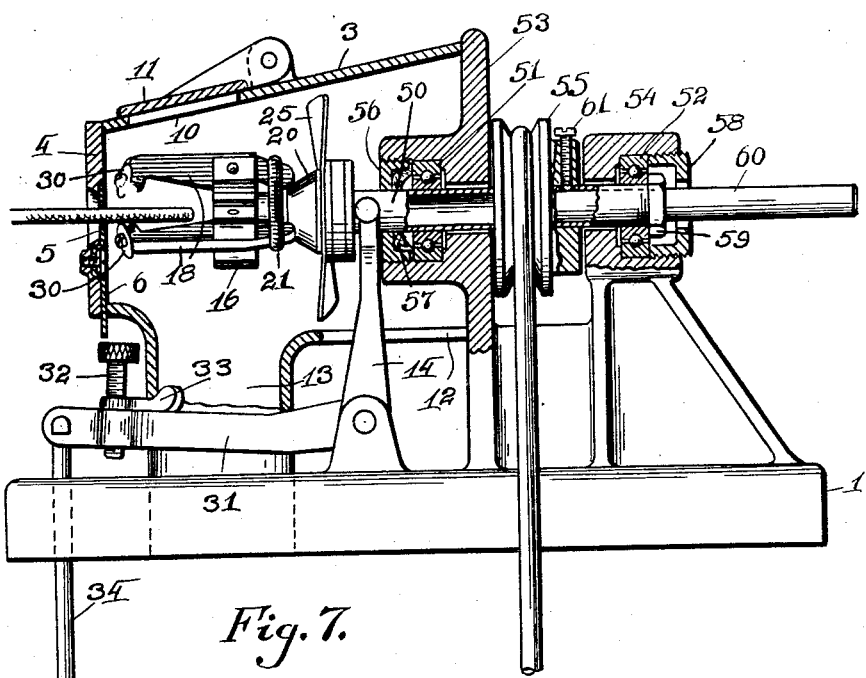
Figure 7 is a partial side elevation and sectional view of a modified form of the stripping machine with which the insulation may be stripped at predetermined intermediate points in the length of the wire and also over a longer distance than is possible with the machine illustrated in Figure 1.

In the modified form of the machine illustrated in Figure 7 the spindle of the stripping machine is driven by a belt or train of gearing. This construction of the machine makes it possible to use a hollow spindle with suitable adjusting means so that longer ends of the wire or sections intermediate of the ends of the wire can be stripped with the machine. The stripping mechanism of the machine remains the same in this form of the machine except that the spindle 50 is hollow and is mounted in two ball bearings 51 and 52 which are mounted in the uprights 53 and 54. The two uprights are spaced and between them is located on the spindle the driving pulley 55. This pulley is suitably keyed to the spindle and is driven by a belt from a motor or other source of power. The ball bearing 51 is held in place in the upright by the nut 56 but between it and the ball bearing 51 and surrounding the spindle 50 is placed the felt washer 57 which serves to keep the dust out of the ball bearing 51.

A nut 58 is threaded into the upright 54 and holds the ball bearing 52 in place therein. The spindle 50 has the nut 59 threaded to the end of it, which nut together with pulley 55 keyed to the spindle serve to hold the spindle against endwise movement within the ball bearings 51 and 52.

The gauge for gauging the length of wire to be stripped is provided in this form of the machine by the plunger 60. This plunger is inserted into the rear end of the hollow spindle and can be fastened in place therein at any desired distance by means of the set screw 61. The wire to be stripped may thus be inserted into the machine until the end of the wire strikes the forward end of the plunger within the hollow spindle which has been inserted into the spindle so that on the operation of the stripper head at this point the desired length of the insulation is stripped from the wire.

If desired the plunger may be entirely withdrawn from the spindle allowing the wire to be stripped to extend thru the spindle any desire length. A section of the insulation of the wire intermediate of the ends can then be stripped from the wire by simply operating the stripper head at the proper point in the wire and withdrawing the wire the desired length it is required to strip the insulation at this point.

Figure 8:
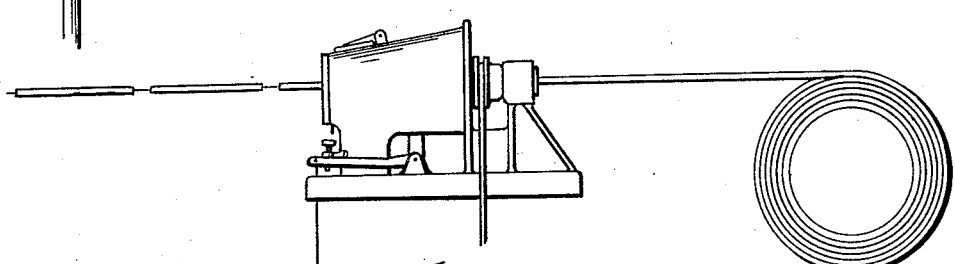
Figure 8 is a diagrammatic view of the wire stripping machine illustrated in Figure 7 illustrating the manner in which a continuous length of wire may be stripped at predetermined intervals by feeding the wire from a roll through the stripping machine from the rear thereof.

As illustrated in Figure 8 the insulation may be stripped at predetermined intervals from a continuous length of wire. For this operation the wire is fed from its roll thru the rear of the hollow spindle and pulled thru the spindle, stripper head and the openings in the gauge plate and cover plate at the front of the machine. By pulling the wire a predetermined distance thru the machine without operating the stripper head and then operating the stripper head while the wire is pulled another predetermined distance, a wire of any length may be stripped of its insulation at predetermined intervals and the insulation stripped over any desired length at these intervals.

Wire thus stripped can then be cut apart intermediate of the stripped sections so that each section of the wire cut off will have both of its ends stripped of the insulation. In this way it may be said that with the aid of this machine two ends of successive lengths of wire are stripped of their insulation at the same time, as the stripped section which provides the end of one length of wire also provides the stripped end for the beginning of the succeeding length of wire. This is illustrated in Figure 9 where the dotted lines indicated by reference numerals 70 and 71 show the points at which the wire is to be cut at the stripped sections.

Wire stripped at suitable intervals is also used to have leads or bus bars fastened to the stripped sections at these intervals in order to facilitate making connections with the wire at predetermined points.

Another important feature of the machine lies in the fact that more than two cutters are used so that when the stripper head is operated the cutters or knives close in uniformly against a common center which is occupied by the wire to be stripped. The depth thru which the cutters or knives are to cut can thus be properly gauged. This allows the outer insulation of multi-conductor cable to be stripped without cutting into the insulation of the individual conductors. The insulation of the individual conductors may then be stripped separately and a shorter distance than the insulation of the complete cable.

In Figure 9 is illustrated a continuous section of wire which has been stripped in the machine and the dotted lines indicated by reference numerals 70 and 71 indicate where the stripped sections may be cut to provide stripped ends at either end of a section of wire when cut from the continuous length of wire.

We claim:

1. In a wire stripping machine having a stripper head and means for locating the wire to be stripped in a predetermined position with relation thereto, the combination of a plurality of circular knives carried by said stripper head and mounted concentrically to the center of rotation of said stripper head and in an angular position to each other, means for uniformly moving said circular knives in their relative angular position toward a common center during the rotation of said stripper head to have their cutting edges overlap one another and cut the insulation of a wire located in said stripper head radially and axially to the wire.

2. In a wire stripping machine having a stripper head and means for locating the wire to be stripped in a predetermined central position with relation thereto, the combination of a hollow shaft supporting said stripper head, a plurality of circular knives mounted on said stripper head concentric to said hollow shaft and at an angle thereto, means for moving said circular knives in their angular position toward a common center during the rotation of said stripper head to have their cutting edges simultaneously engage the insulation of the wire to be stripped in their angular position and cut the insulation radially and axially on its movement thru said hollow shaft.

3. In a wire stripping machine having a stripper head the combination of a jaw lever mounted to rock on said stripper head, a circular knife carried in a vertical and horizontal angular position on each of said jaw levers and means for rotatably adjusting said circular knives on the end of said jaw levers.

In testimony whereof we affix our signatures.

CHARLES B. MAHAN.
CARL M. WEBER.